Feb. 9, 1926.
J. E. POINTON
1,572,080
DOUGH MOLDING MACHINE
Filed August 31, 1925      2 Sheets-Sheet 1
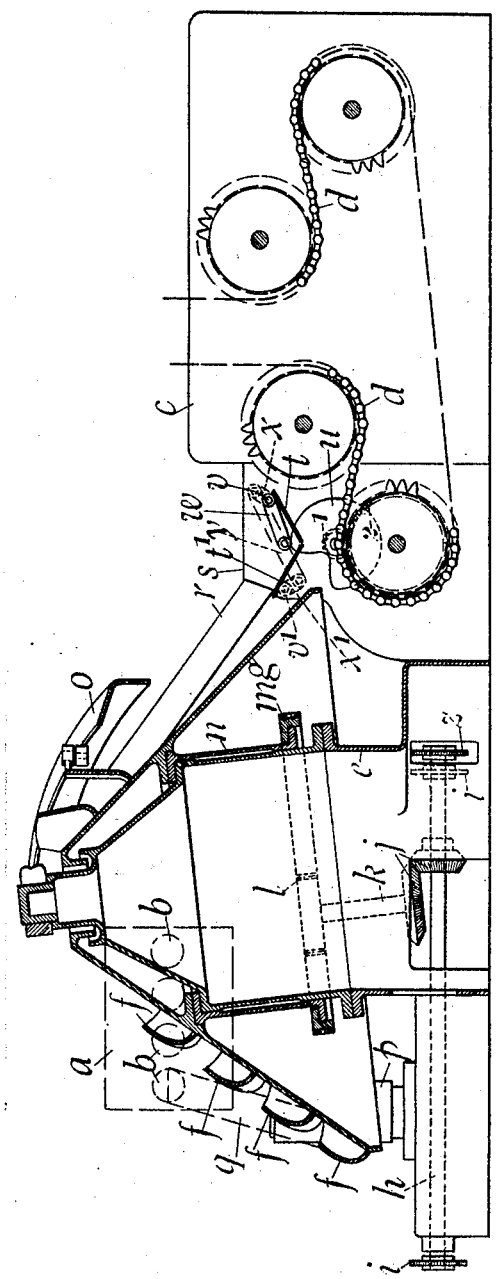
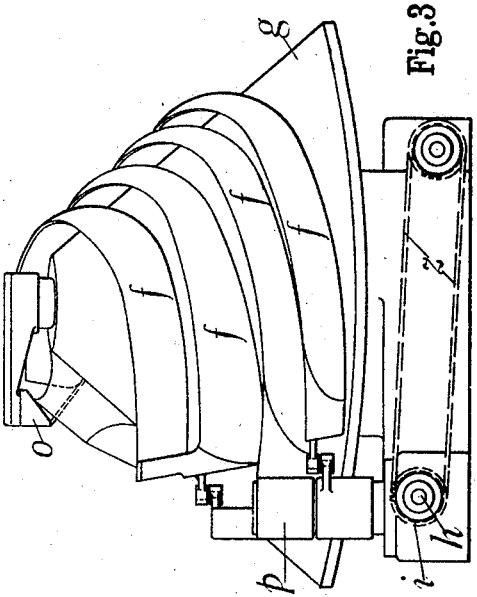
INVENTOR
J. E. Pointon
By Marks & Clerk
attys Feb. 9, 1926. 1,572,080
J. E. POINTON
DOUGH MOLDING MACHINE
Filed August 31, 1925 2 Sheets-Sheet 2

INVENTOR
J. E. Pointon
By Marks & Clerk
attys

Patented Feb. 9, 1926.

1,572,080

UNITED STATES PATENT OFFICE.

JOHN EDWARD POINTON, OF LONDON, ENGLAND, ASSIGNOR TO BAKER-PERKINS COMPANY INCORPORATED, OF WHITE PLAINS, NEW YORK.

DOUGH-MOLDING MACHINE.

Application filed August 31, 1925. Serial No. 53,702.

*To all whom it may concern:*

Be it known that I, JOHN EDWARD POINTON, a British subject, residing at Hythe Road, Willesden Junction, London, NW. 10, England, have invented certain new and useful Improvements Relating to Dough-Molding Machines, of which the following is a specification.

This invention relates to machines for the molding of dough for bread making, particularly of the type known as preliminary molding or handing up machines wherein the dough portions from a divider are, prior to admission to the prover, subjected to a rolling and screw like motion by means of a rotating conical table with which is arranged a spirally disposed fixed trough or conduit.

The invention has for its object to facilitate the molding of the whole of the dough portions delivered on each discharge of the division boxes of the divider and the subsequent placing of the same on the prover trays or shelves.

The invention comprises the combination with the conical rotating table or like element of the handing up or molding machine, of a plurality of spirally disposed troughs or conduits and the arrangement of the same with respect to a multiple box divider and a prover to simultaneously receive the whole of the dough portions on each discharge of the divider boxes, and similarly deposit them after the molding operation upon a shelf or tray of the prover.

Referring to the accompanying sheet of explanatory drawings:—

Figure 1 is a sectional elevation, Figure 2 a plan, and Figure 3 an end elevation illustrating a dough molding machine or molder, constructed in accordance with this invention.

The same reference letters in the different views indicate the same or similar parts.

Figure 2:
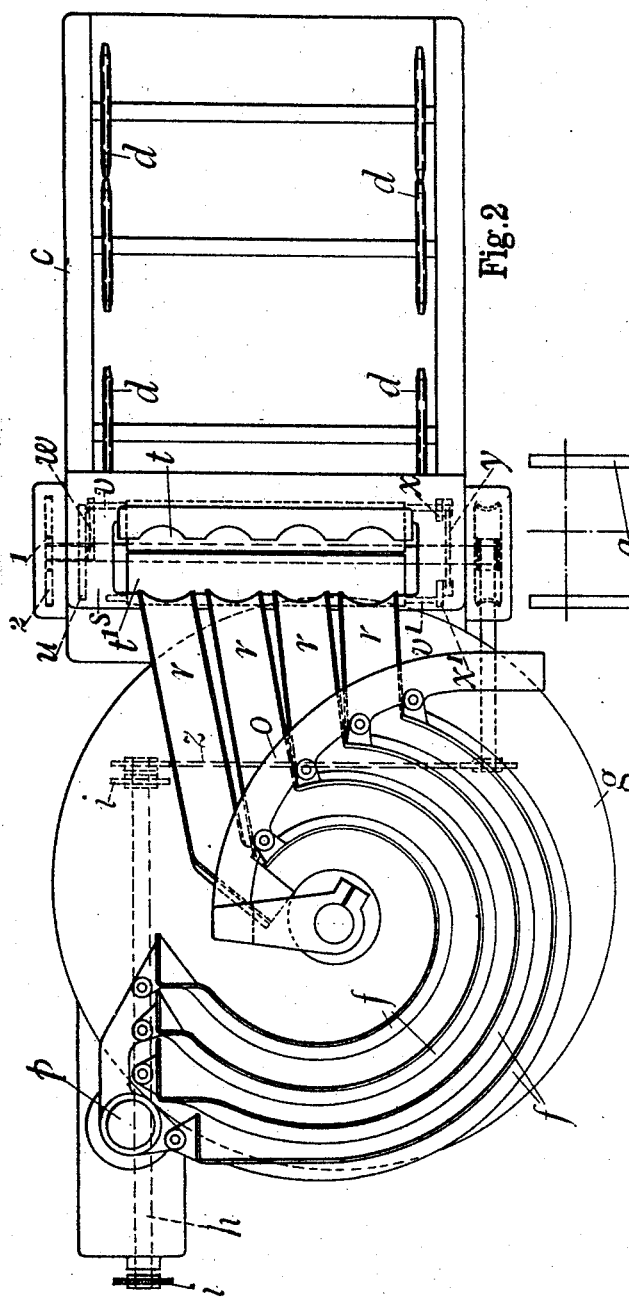
Figure 4:
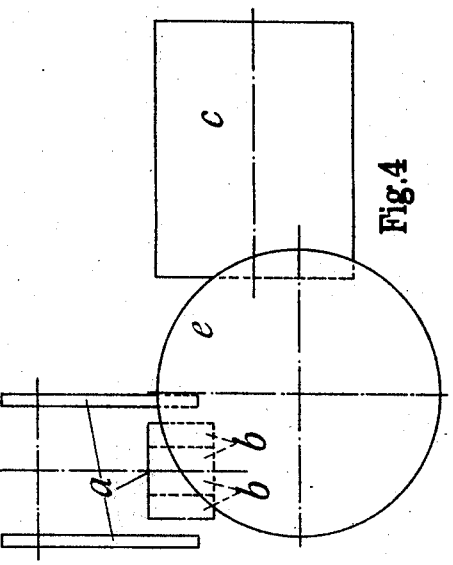
Figure 4 is a diagrammatic plan showing the position of the said molder relatively to the dough dividing machine, or divider, and the proving machine, or prover.

In the illustrated application of the invention to an automatic bread making plant comprising a dough divider $a$ having a plurality of division boxes $b$ and a prover $c$ with trays or shelves carried by either continuous or intermittently moving endless chains $d$, the hander up or preliminary molder $e$ has a plurality of troughs or conduits $f$ corresponding with the said division boxes. Thus for use with a four box divider the hander up has four troughs or conduits spirally disposed as shown with respect to the cone or table $g$. The axis of the said cone or table is preferably inclined with respect to the base of the machine and it is rotated through gearing driven from the divider or in any other convenient manner. The gearing shown in the illustration comprises the counter-shaft $h$ with the chain wheels $i$, driven from the divider, and bevel gears $j$, spindle $k$, and pinion $l$ engaging the wheel or annulus $m$ which is secured to the internal boss like part $n$ affixed to the cone or table $g$.

The troughs $f$ are supported in any convenient manner. Thus, at the one side or end the troughs are attached to the bracket or bridge like member $o$ and the other side or end to the post or like support $p$.

The admission ends of the troughs $f$ are suitably arranged with respect to the discharge position of the division boxes $b$ to receive the dough portions immediately on discharge from such boxes. A shoot as $q$ may be employed to facilitate the feeding of the bottom trough. To provide substantial uniformity in the length of the respective troughs and thus in the extent of the molding action on the dough pieces passing therethrough, the troughs nearer to the centre of the cone $g$ extend, as shown, through a greater portion of a circle than the troughs more remote from the centre. The discharge ends of the troughs will thus be at varying distances from the centre of the cone but extension pieces or delivery arms $r$ of varying length are employed so that the molded dough portions discharge in alignment into a hopper $s$ or the like arranged to direct the said portions on to the prover trays or shelves. The said hopper or the like has a retaining slide or flaps as $t$, $t'$ arranged for operation by a timing cam $u$ associated with a lever or link system and working in unison with the prover to ensure that the dough pieces pass out from the hopper only when a prover shelf or tray is in position to receive them. The said link system comprises shafts $v$ and $v'$ having the respective flaps $t$, $t'$ secured thereto. The shaft $v$ has the lever $w$ secured to one end of it, said lever abutting on cam $u$, and the short lever $x$ to the opposite end, said lever $x$ being connected by link $y$ to the lever $x'$ on the shaft $v'$. Thus, by the action of the cam $u$ on lever $w$ the shafts $v$, $v'$ carrying the flaps $t$, $t'$ are rocked in opposite directions.

The gearing for the operation of the prover chains $d$ may be actuated from the aforesaid counter-shaft $i$ through chain drive $z$. The cam $u$ aforesaid is rotated from the prover through the gear 1 and 2.

Having thus described my invention what I claim as new and desire to secure by Letters Patent is:—

1. In dough molding machines, the combination with a conical rotating table, of means whereby the movement of said table effects the simultaneous molding of the whole of the dough portions received from each discharge of a multiple box dough divider and delivers said molded portions on to a dough prover, said means comprising a plurality of spirally disposed troughs fixed above but adjacent the said table and forming conduits between the said divider and prover.

2. In dough molding machines, the combination with a conical rotating table, of means whereby the movement of said table effects the simultaneous molding of the whole of the dough portions received from each discharge of a multiple box dough divider and delivers said molded portions on to a dough prover, said means comprising a plurality of spirally disposed troughs fixed above but adjacent the said table, and delivery arms between the outlet ends of said troughs and the said prover.

3. In dough molding machines operating in association with a dough divider and a dough prover, the combination comprising a conical rotating table, a plurality of spirally disposed troughs of approximately uniform length fixed respectively over and under each other above but adjacent the said table and in position to receive at one end the whole of the dough portions from each discharge of a multiple box dough divider, and delivery arms between the opposite ends of the said troughs and the dough prover, the said arms being of varying length to accommodate the varying distances between the respective troughs and the said prover.

4. In dough molding machines operating in association with a dough divider and a dough prover, the combination comprising a conical rotating table, a plurality of spirally disposed troughs fixed respectively over and under each other above but adjacent the said table and in position to receive at one end the whole of the dough portions from each discharge of a multiple box dough divider, delivery arms at the opposite ends of the trough, and a hopper between the outlet ends of said arms and the dough prover.

5. In dough molding machines operating in association with a dough divider and a dough prover, the combination comprising a conical rotating table, a plurality of spirally disposed troughs fixed respectively over and under each other above but adjacent the said table and in position to receive at one end the whole of the dough portions from each discharge of a multiple box dough divider, delivery arms at the opposite ends of the trough, a hopper between the outlet ends of said arms and the dough prover, and means controlling the delivery of the molded dough portions from said hopper to the said prover.

In testimony whereof I have signed my name to this specification.

JOHN EDWARD POINTON.